US012587075B2

(12) United States Patent
Condo et al.

(10) Patent No.: US 12,587,075 B2
(45) Date of Patent: Mar. 24, 2026

(54) GENERATOR ROTOR CENTERING JIG

(71) Applicant: Schaeffler Technologies AG & Co. KG, Herzogenaurach (DE)

(72) Inventors: Michael Condo, Clinton, OH (US); Aaron Mueller, Mansfield, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 747 days.

(21) Appl. No.: 17/878,969

(22) Filed: Aug. 2, 2022

(65) Prior Publication Data

US 2024/0048032 A1    Feb. 8, 2024

(51) Int. Cl.
H02K 15/16    (2025.01)

(52) U.S. Cl.
CPC .................................... H02K 15/16 (2013.01)

(58) Field of Classification Search
CPC ...... H02K 5/1735; H02K 15/60; H02K 7/075; H02K 15/16; H02K 7/1815; F02B 63/042
See application file for complete search history.

(56) References Cited

U.S. PATENT DOCUMENTS

| | | | | |
|---|---|---|---|---|
| 5,065,499 | A * | 11/1991 | Luciano | ................. H02K 15/00 29/736 |
| 6,739,034 | B2 * | 5/2004 | Suzuki | ................... H02K 15/16 29/736 |
| 11,933,258 | B2 | 3/2024 | Ramsey | |
| 12,341,402 | B2 | 6/2025 | Ramsey | |
| 2006/0207098 | A1 * | 9/2006 | Tamaoka | ............. H02K 5/1675 384/100 |
| 2020/0393036 | A1 | 12/2020 | Steinberger et al. | |
| 2024/0048032 | A1 * | 2/2024 | Condo | ................... H02K 15/16 |

* cited by examiner

*Primary Examiner* — Minh N Trinh

(57) ABSTRACT

A centering jig for a generator rotor including a housing, a pin, a spring, and a compressing element. The housing has a plate arranged for bolting to a generator housing, the pin extends through the plate and has a head portion, the spring is arranged to apply a force to the head portion, and the compressing element is for compressing the spring. In some example embodiments, the plate has a first pair of apertures radially offset from the pin. In some example embodiments, the housing also includes a pair of tubular portions extending from the plate and aligned with respective ones of the first pair of apertures. In an example embodiment, the plate also includes a second pair of apertures radially offset from the first pair of apertures. In an example embodiment, the pin has a distal end arranged for contacting a shaft of the generator rotor.

15 Claims, 3 Drawing Sheets

GENERATOR ROTOR CENTERING JIG

TECHNICAL FIELD

The present disclosure relates generally to a generator rotor, and more specifically to a generator rotor centering jig.

BACKGROUND

Shipping jigs are known. One example is shown and described in commonly assigned United States Patent Application Publication No. 2020/0393036 titled HYBRID MODULE SHIPPING STRAP to Steinberger et al.

SUMMARY

Example embodiments broadly comprise a centering jig for a generator rotor including a housing, a pin, a spring, and a compressing element. The housing has a plate arranged for bolting to a generator housing, the pin extends through the plate and has a head portion, the spring is arranged to apply a force to the head portion, and the compressing element is for compressing the spring. In some example embodiments, the plate has a first pair of apertures radially offset from the pin. In some example embodiments, the housing also includes a pair of tubular portions extending from the plate and aligned with respective ones of the first pair of apertures. In an example embodiment, each one of the pair of tubular portions has an axially extending cutout such that each one of the pair of tubular portions has an arcuate cross-section. In an example embodiment, the plate also includes a second pair of apertures radially offset from the first pair of apertures. In an example embodiment, the pin has a distal end, opposite the head portion, arranged for contacting a shaft of the generator rotor.

In some example embodiments, the housing also includes a tubular portion extending from the plate, the tubular portion has a first bore, and the spring is disposed in the first bore. In an example embodiment, the centering jig also includes an intermediate disk disposed in the first bore between the spring and the head portion.

In some example embodiments, the compressing element is a set screw, the first bore includes a threaded portion, and the set screw is threaded into the threaded portion to compress the spring. In some example embodiments, the tubular portion includes a second bore, larger than the first bore and aligned with the first bore, and an annular surface between the first bore and the second bore. The set screw has an annular head portion arranged for contacting the annular surface. In an example embodiment, the centering jig also includes a snap ring. The second bore has a groove and the snap ring is installed in the groove to restrict axial movement of the set screw in the second bore.

In some example embodiments, the compression element is a cam, the centering jig also includes a pivot pin, the tubular portion includes a slot, the cam is pivotably installed in the slot to compress and decompress the spring, and the pivot pin extends through the tubular portion and the cam. In an example embodiment, the center jig also includes a spring pin with a head, disposed axially between the cam and the spring, and a body, extending radially inside of the spring. In an example embodiment, the centering jig also includes a handle extending from the cam to pivot the cam in the slot. In an example embodiment, the centering jig also includes a removable detent pin. The cam has an aperture and the detent pin is installed in the aperture to prevent rotation of the cam in the slot.

Other example embodiments broadly comprise a generator module including a generator housing having a first conical surface, the centering jig bolted to the generator housing, and a generator rotor having a second conical surface pressed onto the first conical surface by the centering jig. In an example embodiment, the generator rotor also includes a shaft, and the pin is arranged to apply an axial force to the shaft to press the second conical surface onto the first conical surface.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figures 1, 2:
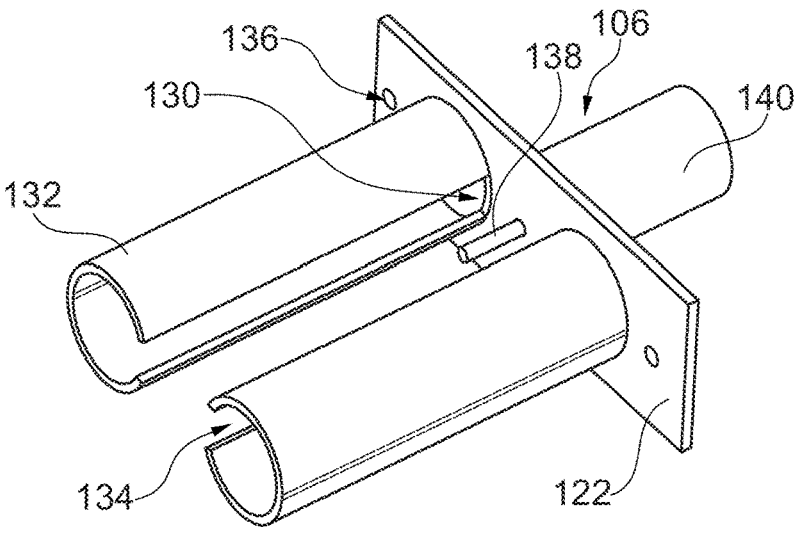
FIG. 1 illustrates a partial cross-sectional view of a generator module with a generator rotor centered in a housing by a centering jig according to an example embodiment.
FIG. 2 illustrates a perspective view of the centering jig of FIG. 1.

The following description is made with reference to FIGS. 1-2. FIG. 1 illustrates a partial cross-sectional view of generator module 100 with generator rotor 102 centered in generator housing 104 by centering jig 106 according to an example embodiment. FIG. 2 illustrates a perspective view of centering jig 106 of FIG. 1.

Generator module 100 includes generator housing 104 with conical surface 110, centering jig 106 bolted to the generator housing, and generator rotor 102 with conical surface 112 pressed onto conical surface 110 by the centering jig. By pressing the two conical surfaces together, the rotor stays centered in the housing, preventing damage to the rotor from impacts with the housing and/or generator stator 114 prior to being bolted to a combustion engine, for example. Generator rotor includes shaft 116 and centering jig 106 includes pin 118 arranged to apply an axial force to the shaft to press the conical surfaces together, as described in more detail below.

Centering jig 106 includes housing 120 with plate 122 arranged for bolting to generator housing 104, pin 118, spring 124 and compressing element 126. The pin extends through the plate and includes head portion 128, and the spring is arranged to apply a force to the head portion. The compressing element is for compressing, the spring. Plate 122 includes apertures 130 radially offset from the pin for receiving combustion engine mounting bolts (not shown) to fix the generator rotor to a combustion engine crankshaft (not shown), for example. Tubular portions 132 extend from the plate and are each aligned with one of apertures 130. The tubular portions ease assembly of the bolts that fix the generator rotor to the combustion engine crankshaft by preventing the bolts from falling into the generator module during assembly, for example. As can be seen in FIG. 2, for example, each of the tubular portions has an axially extending cutout 134 such that the tubular portions have arcuate cross-sections. These cutouts may provide clearance for shaft 116, for example. Plate 122 also includes apertures 136 radially offset from apertures 130 for receiving bolts (not shown) to fix the housing to the generator housing. In this way, the centering jig can be unbolted and removed from the generator housing once the generator module is assembled with the combustion engine.

Pin 118 includes distal end 138, opposite head portion 128, arranged for contacting the shaft of the generator rotor to press the two conical surfaces together, for example. Housing 120 includes tubular portion 140 extending from the plate. Tubular portion 140 includes bore 142, and spring 124 is disposed in bore 142. The centering jig also includes intermediate disk 144 disposed in bore 142 between the spring and the head portion.

Figure 3:
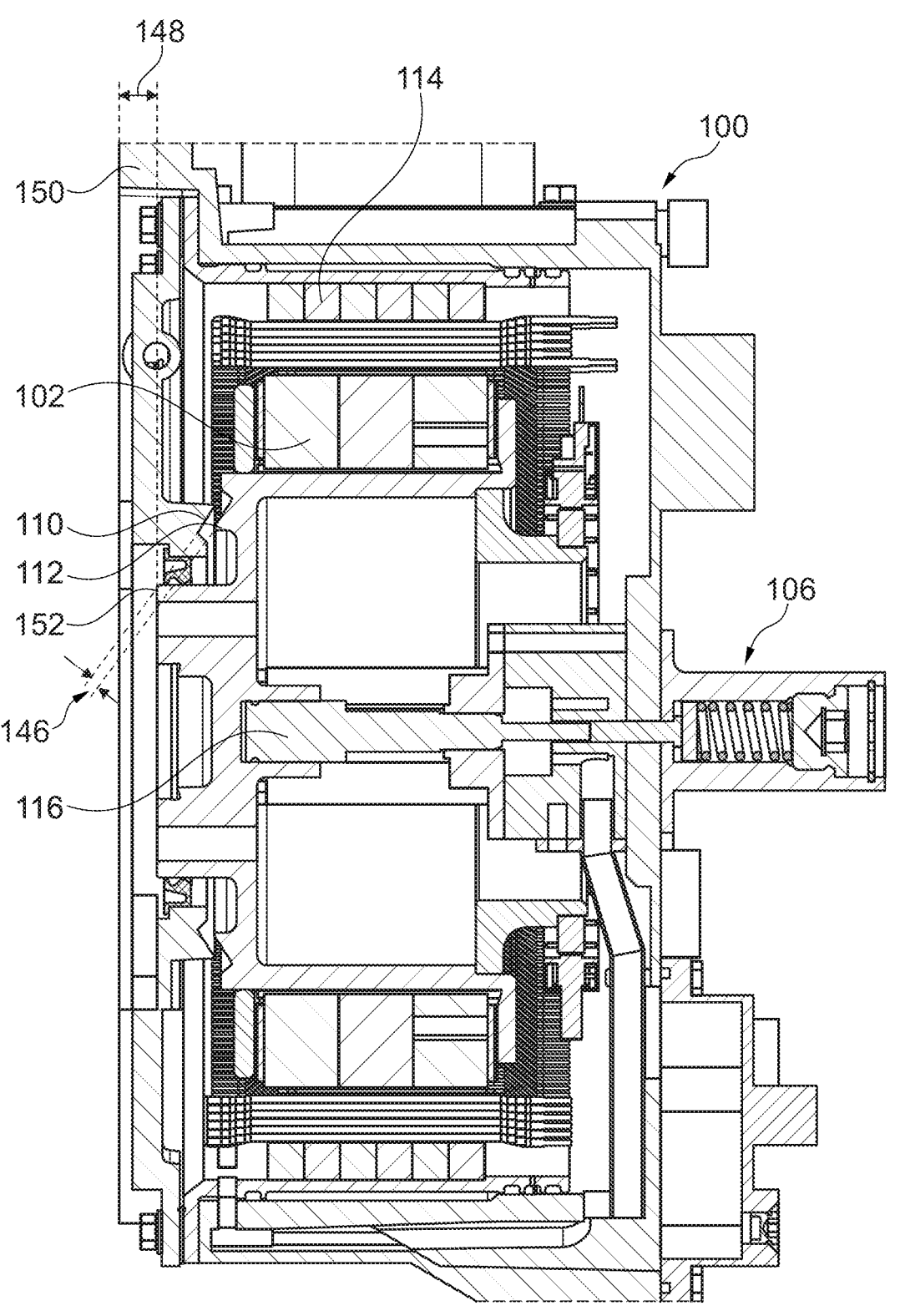
FIG. 3 illustrates a cross-sectional view of the generator module of FIG. 1 after bolting to a combustion engine.

The following description is made with reference to FIG. 3. FIG. 3 illustrates a cross-sectional view of generator module 100 after bolting to a combustion engine (not shown). As can be seen in the figure, once the module is bolted to the engine, gap 146 is created between the conical surfaces. This is because a distance between an engine block bolting surface (not shown) and an engine crankshaft bolting surface (not shown) is greater than distance 148 between housing bolting surface 150 and rotor bolting surface 152. This difference pushes the rotor to the right (as shown in FIG. 3), further compressing, the spring and releasing the conical surfaces from one another. At this point, the centering function formerly performed by the conical surfaces is now performed by the combustion engine. That is, a distance between mounting points of the engine block and the crankshaft is controlled by bearings and precision machining so that, once the module housing and rotor are fixed to the combustion engine, the generator rotor remains centered relative the housing and the generator stator. At this point, tension on the spring can be removed (e.g., the compressing element can be released as described below) and the centering jig can be removed (e.g., unbolted) from the housing and returned to the module manufacturing facility to be installed on another module prior to transport.

Returning to FIGS. 1-2, compressing element 126 is depicted as a set screw. Bore 142 includes a threaded portion and the set screw is threaded into the threaded portion to compress the spring. That is, the further the set screw is threaded into the bore, the further the spring is compressed. The tubular portion also includes bore 154, larger than bore 142 and aligned with bore 142. By aligned, we mean that bores 142 and 154 share a common central axis. The tubular portion also includes annular surface 156 between the bores and the set screw has an annular head portion arranged for contacting the annular surface. That is, the set screw can be threaded into the bore until the head contacts the annular surface. This feature may be useful for providing a predetermined compression of the spring that provides sufficient force on the rotor to keep the conical surfaces in contact during movement during transport and assembly of the module. Bore 154 includes a groove and snap ring 158 is installed in the groove to restrict axial movement of the set screw in the second bore. In other words, when the set screw is loosened, the snap ring prevents the set screw from falling out of the bore. This feature may be useful to prevent loss of the set screw once the jig is removed from the generator housing, allowing the jig to be reused on another housing as described above.

Figure 4:
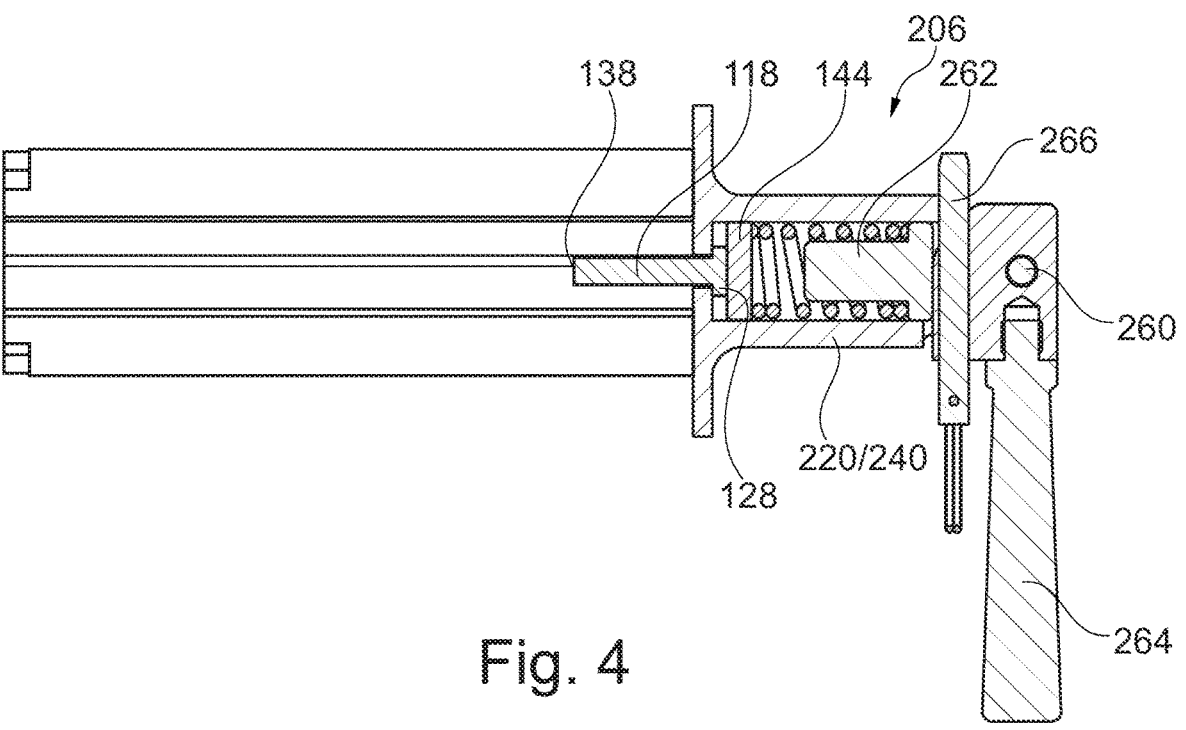
FIG. 4 illustrates a cross-sectional view of an alternative embodiment of the centering jig of FIG. 1.
Figure 5:
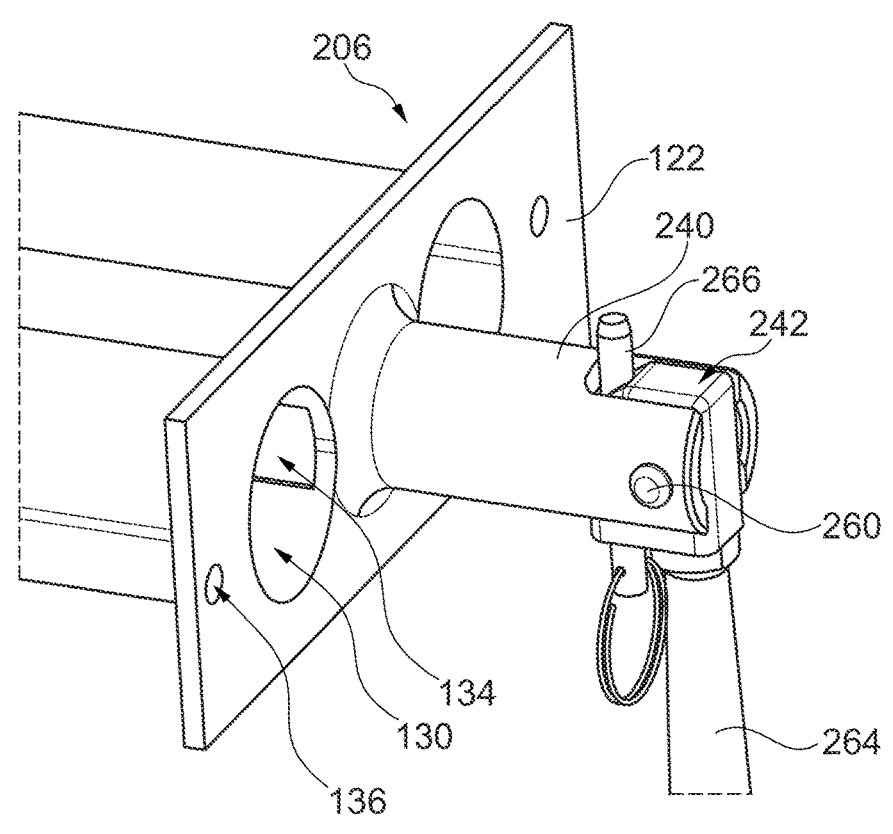
FIG. 5 illustrates a partial perspective view of the centering jig of FIG. 4.

The following description is made with reference to FIGS. 4-5. FIG. 4 illustrates a cross-sectional view of an alternative embodiment of the centering jig of FIG. 1. FIG. 5 illustrates a partial perspective view of the centering jig of FIG. 4. Centering jig 206 operates in much the same manner as centering jig 106 described above, except as noted below. In the embodiment shown, compression element 126 is a cam. By cam, we mean that the compression element is pivotable and includes a spiral surface that gradually compresses the spring as the cam is rotated.

Centering jig 206 also includes pivot pin 260 and tubular portion 240 extending from housing 220 includes a slot 242. The cam is pivotably installed in the slot to compress and decompress the spring and the pivot pin extends through the tubular portion and the cam. Centering jig 206 also includes spring pin 262 with a head, disposed axially between the cam and the spring, and a body, extending radially inside of the spring. Centering jig 206 includes handle 264 extending from the cam to pivot the cam in the slot. Handle 264 may be threaded into the cam or may be formed together with the cam from a single piece of material, for example.

Centering jig 206 also includes removable detent pin 266. As shown in the figures, the cam has an aperture and the detent pin is installed in the aperture to prevent rotation of the cam in the slot. In other words, once the cam is rotated and the spring is compressed, the detent pin is inserted into the cam to prevent rotation of the cam and a release of the spring force on the rotor. As discussed above, bolting the module onto a combustion engine further compressed the spring and, in order to prevent injury when the centering jig is unbolted, the detent pin is removed to reduce or eliminate compression in the spring, thereby allowing the jig to be removed.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Generator module
102 Generator rotor
104 Generator housing
106 Centering jig
110 Conical surface (first)
112 Conical surface (second)
114 Generator stator
116 Shaft (generator rotor)
118 Pin (centering jig)
120 Housing
122 Plate
124 Spring
126 Compressing element
128 Head portion (pin)
130 Apertures (first)
132 Tubular portions
134 Cutout
136 Apertures (second)
138 Distal end (pin)
140 Tubular portion
142 Bore (first)
144 Intermediate disk
146 Gap (between conical surfaces)
148 Distance (between bolting surfaces)
150 Housing bolting surface
152 Rotor bolting surface
154 Bore (second)
156 Annular surface
158 Snap ring
206 Centering jig
220 Housing
240 Tubular portion
242 Slot
260 Pivot pin
262 Spring pin
264 Handle
266 Detent pin

What is claimed is:

1. A centering jig for a generator rotor, comprising:
a housing comprising a plate arranged for bolting to a generator housing;
a pin extending through the plate and comprising a head portion;
a spring arranged to apply a force to the head portion; and
a compressing element for compressing the spring, wherein:
the plate comprises a first pair of apertures radially offset from the pin; and

a second pair of apertures radially offset from the first pair of apertures.

2. The centering jig of claim 1 wherein the housing further comprises a pair of tubular portions extending from the plate and aligned with respective ones of the first pair of apertures.

3. The centering jig of claim 2 wherein each one of the pair of tubular portions has an axially extending cutout such that each one of the pair of tubular portions has an arcuate cross-section.

4. The centering jig of claim 1 wherein the pin comprises a distal end, opposite the head portion, arranged for contacting a shaft of the generator rotor.

5. A centering jig for a generator rotor, comprising:
a housing comprising a plate arranged for bolting to a generator housing;
a pin extending through the plate and comprising a head portion;
a spring arranged to apply a force to the head portion; and
a compressing element for compressing the spring, wherein:
the plate comprises a first pair of apertures radially offset from the pin; and
the housing further comprises a pair of tubular portions extending from the plate and aligned with respective ones of the first pair of apertures.

6. The centering jig of claim 5 wherein each one of the pair of tubular portions has an axially extending cutout such that each one of the pair of tubular portions has an arcuate cross-section.

7. A centering jig for a generator rotor, comprising:
a housing comprising a plate arranged for bolting to a generator housing;
a pin extending through the plate and comprising a head portion;
a spring arranged to apply a force to the head portion; and
a compressing element for compressing the spring, wherein:
the housing further comprises a tubular portion extending from the plate;
the tubular portion comprises a first bore; and
the spring is disposed in the first bore.

8. The centering jig of claim 7 further comprising an intermediate disk disposed in the first bore between the spring and the head portion.

9. The centering jig of claim 7, wherein:
the compressing element is a set screw;
the first bore comprises a threaded portion; and
the set screw is threaded into the threaded portion to compress the spring.

10. The centering jig of claim 9 wherein:
the tubular portion comprises:
a second bore, larger than the first bore and aligned with the first bore; and
an annular surface between the first bore and the second bore; and
the set screw comprises an annular head portion arranged for contacting the annular surface.

11. The centering jig of claim 10 further comprising a snap ring, wherein:
the second bore comprises a groove; and
the snap ring is installed in the groove to restrict axial movement of the set screw in the second bore.

12. The centering jig of claim 7 wherein:
the compression element is a cam;
the centering jig further comprises a pivot pin;
the tubular portion comprises a slot;

the cam is pivotably installed in the slot to compress and decompress the spring; and the pivot pin extends through the tubular portion and the cam.

13. The centering jig of claim 12 further comprising a spring pin with a head, disposed axially between the cam and the spring, and a body, extending radially inside of the spring.

14. The centering jig of claim 12 further comprising a handle extending from the cam to pivot the cam in the slot.

15. The centering jig of claim 12 further comprising a removable detent pin, wherein:

the cam comprises an aperture; and the detent pin is installed in the aperture to prevent rotation of the cam in the slot.

\* \* \* \* \*